United States Patent
Kessler et al.

(10) Patent No.: US 11,646,971 B2
(45) Date of Patent: *May 9, 2023

(54) LIMITING BACKPRESSURE WITH BAD ACTORS

(71) Applicant: MARVELL ASIA PTE, LTD., Singapore (SG)

(72) Inventors: Richard E. Kessler, Northborough, MA (US); Nick Jamba, Lancaster, MA (US); Victor Hart, Southborough, MA (US)

(73) Assignee: Marvell Asia Pte, Ltd., Singapore (SG)

( * ) Notice: Subject to any disclaimer, the term of this patent is extended or adjusted under 35 U.S.C. 154(b) by 394 days.

This patent is subject to a terminal disclaimer.

(21) Appl. No.: 16/921,884

(22) Filed: Jul. 6, 2020

(65) Prior Publication Data

US 2020/0336433 A1 Oct. 22, 2020

Related U.S. Application Data

(63) Continuation of application No. 16/029,031, filed on Jul. 6, 2018, now Pat. No. 10,721,172.

(51) Int. Cl.
*H04L 47/30* (2022.01)
*H04L 47/32* (2022.01)
*H04L 41/14* (2022.01)

(52) U.S. Cl.
CPC ............... *H04L 47/30* (2013.01); *H04L 41/14* (2013.01); *H04L 47/32* (2013.01)

(58) Field of Classification Search
CPC .......... H04L 47/30; H04L 41/14; H04L 47/32
See application file for complete search history.

(56) References Cited

U.S. PATENT DOCUMENTS

| 5,745,778 | A  | 4/1998  | Alfieri    |
|-----------|----|---------|------------|
| 6,189,074 | B1 | 2/2001  | Pedneau    |
| 6,253,262 | B1 | 6/2001  | Rozario    |
| 6,289,369 | B1 | 9/2001  | Sundaresan |
| 6,356,989 | B1 | 3/2002  | Hays       |
| 6,496,847 | B1 | 12/2002 | Bugnion    |

(Continued)

OTHER PUBLICATIONS

"Single Root I/O Virtualization and Sharing Specification Revision 1.01," PCI-SIG®, pp. 1-100 (Jan. 20, 2010).

*Primary Examiner* — Chi H Pham
*Assistant Examiner* — Weibin Huang
(74) *Attorney, Agent, or Firm* — Hamilton, Brook, Smith & Reynolds, P.C.

(57) ABSTRACT

In an embodiment, a method includes, in response to detecting available memory of a destination node of a packet flow of nodes to the destination node being below a particular threshold, marking the destination node as being in a backpressure state. The destination node, in the backpressure state, sends a signal indicating a condition of packet backpressure to the nodes of the packet flow, and initiates a timer for a particular time period. The method further marks, at the end of the particular time period, the destination node as being in a bad actor state if the available memory is below the particular threshold, and as being in a good actor state if the memory is above the particular threshold. The method, in response to marking the destination node as being in a bad actor state, sends a signal to the nodes causing the nodes to drop packets directed to the destination node.

20 Claims, 8 Drawing Sheets

(56) References Cited

U.S. PATENT DOCUMENTS

| | | |
|---|---|---|
| 6,861,865 B1 | 3/2005 | Carlson |
| 6,862,694 B1 | 3/2005 | Tormey |
| 6,954,770 B1 | 10/2005 | Carlson |
| 7,035,889 B1 | 4/2006 | Carlson |
| 7,076,059 B1 | 7/2006 | Kiszeley |
| 7,120,117 B1 * | 10/2006 | Liu .................. H04L 49/253 370/429 |
| 7,205,785 B1 | 4/2007 | Carlson |
| 7,209,531 B1 | 4/2007 | Katz |
| 7,240,203 B2 | 7/2007 | Kessler |
| 7,260,217 B1 | 8/2007 | Carlson |
| 7,275,249 B1 | 9/2007 | Miller |
| 7,305,567 B1 | 12/2007 | Hussain |
| 7,310,722 B2 | 12/2007 | Moy |
| 7,337,314 B2 | 2/2008 | Hussain |
| 7,372,857 B1 | 5/2008 | Kappler |
| 7,398,386 B2 | 7/2008 | Kessler |
| 7,421,533 B2 | 9/2008 | Zimmer |
| 7,657,933 B2 | 2/2010 | Hussain |
| 7,661,130 B2 | 2/2010 | Hussain |
| 7,814,310 B2 | 10/2010 | Bouchard |
| 7,911,960 B1 * | 3/2011 | Aydemir ............... H04L 49/506 370/364 |
| 8,156,495 B2 | 4/2012 | Chew |
| 8,424,014 B2 | 4/2013 | Auernhammer |
| 8,504,750 B1 | 8/2013 | Sonksen |
| 8,881,150 B2 | 11/2014 | Sawa |
| 8,892,962 B2 | 11/2014 | Iwanaga |
| 9,444,751 B1 | 9/2016 | Mresaini |
| 10,721,172 B2 * | 7/2020 | Kessler ............... H04L 41/14 |
| 2004/0216101 A1 | 10/2004 | Burky |
| 2004/0268105 A1 | 12/2004 | Michaelis |
| 2005/0235123 A1 | 10/2005 | Zimmer |
| 2006/0176810 A1 | 8/2006 | Kekki |
| 2006/0288189 A1 | 12/2006 | Seth |
| 2007/0220203 A1 | 9/2007 | Murase |
| 2008/0013715 A1 | 1/2008 | Feghali |
| 2008/0074433 A1 | 3/2008 | Jiao |
| 2008/0077909 A1 | 3/2008 | Collins |
| 2008/0133709 A1 | 6/2008 | Aloni |
| 2008/0320016 A1 | 12/2008 | Singh |
| 2009/0024804 A1 | 1/2009 | Wheeler |
| 2009/0070768 A1 | 3/2009 | Choudhury |
| 2009/0096525 A1 | 4/2009 | Staszewski |
| 2009/0119684 A1 | 5/2009 | Mahalingam |
| 2009/0249094 A1 | 10/2009 | Marshall |
| 2009/0300606 A1 | 12/2009 | Miller |
| 2010/0082603 A1 | 4/2010 | Krompass |
| 2010/0138829 A1 | 6/2010 | Hanquez |
| 2010/0205603 A1 | 8/2010 | Marten |
| 2010/0275199 A1 | 10/2010 | Smith |
| 2010/0332212 A1 | 12/2010 | Finkelman |
| 2011/0161943 A1 | 6/2011 | Bellows |
| 2011/0314478 A1 | 12/2011 | Louise |
| 2012/0039169 A1 | 2/2012 | Susitaival |
| 2012/0052866 A1 | 3/2012 | Froehlich |
| 2012/0096192 A1 | 4/2012 | Tanaka |
| 2012/0179844 A1 | 7/2012 | Brownlow |
| 2012/0260257 A1 | 10/2012 | Accapadi |
| 2012/0327770 A1 * | 12/2012 | Vijayasankar ......... H04L 47/30 370/235 |
| 2013/0055254 A1 | 2/2013 | Avasthi |
| 2013/0097350 A1 | 4/2013 | Ansari |
| 2016/0261512 A1 | 9/2016 | Lautenschlaeger |
| 2016/0344636 A1 | 11/2016 | Elias |
| 2018/0278536 A1 * | 9/2018 | Haramaty ............... H04L 47/39 |
| 2020/0014629 A1 | 1/2020 | Kessler et al. |

* cited by examiner

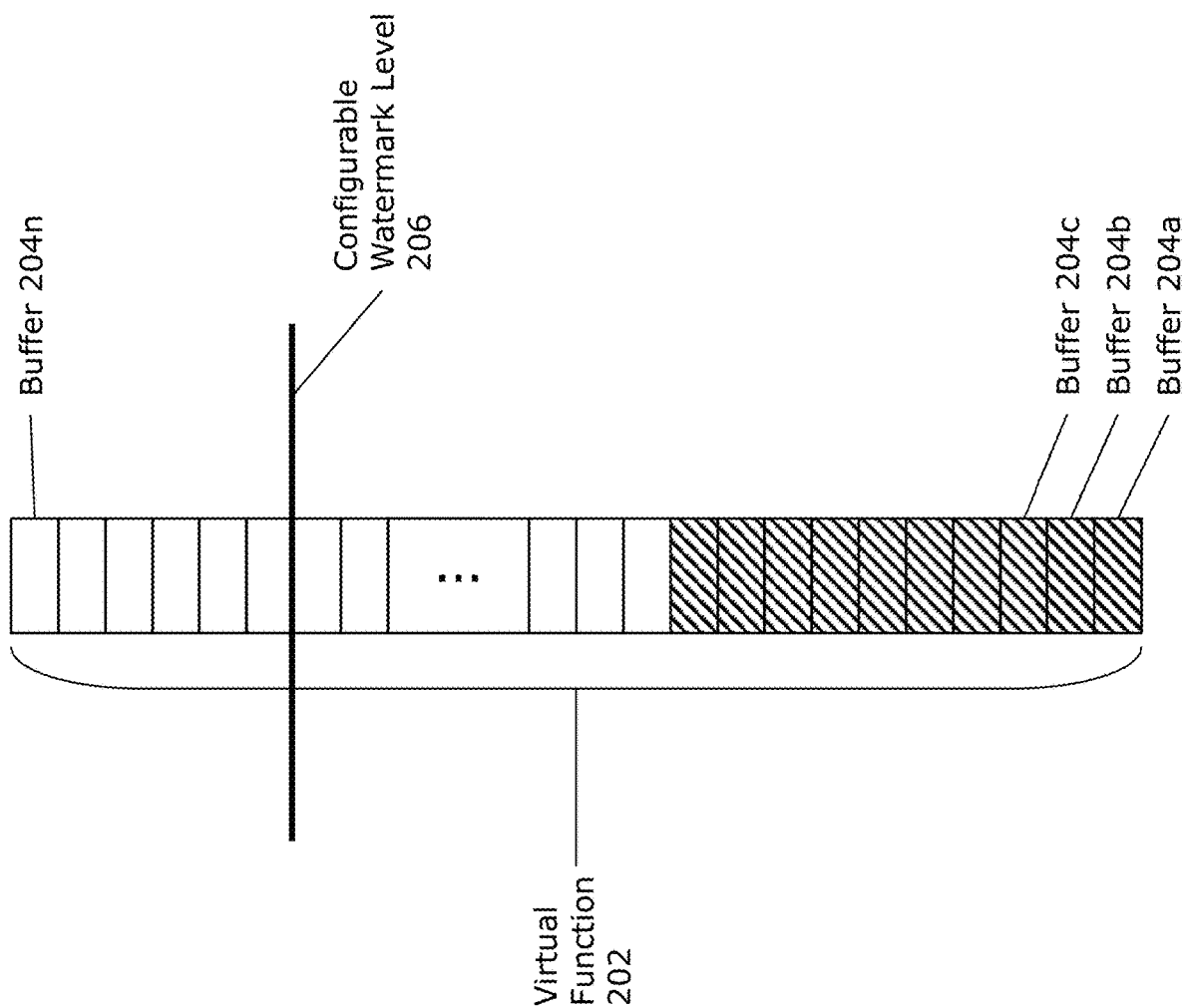

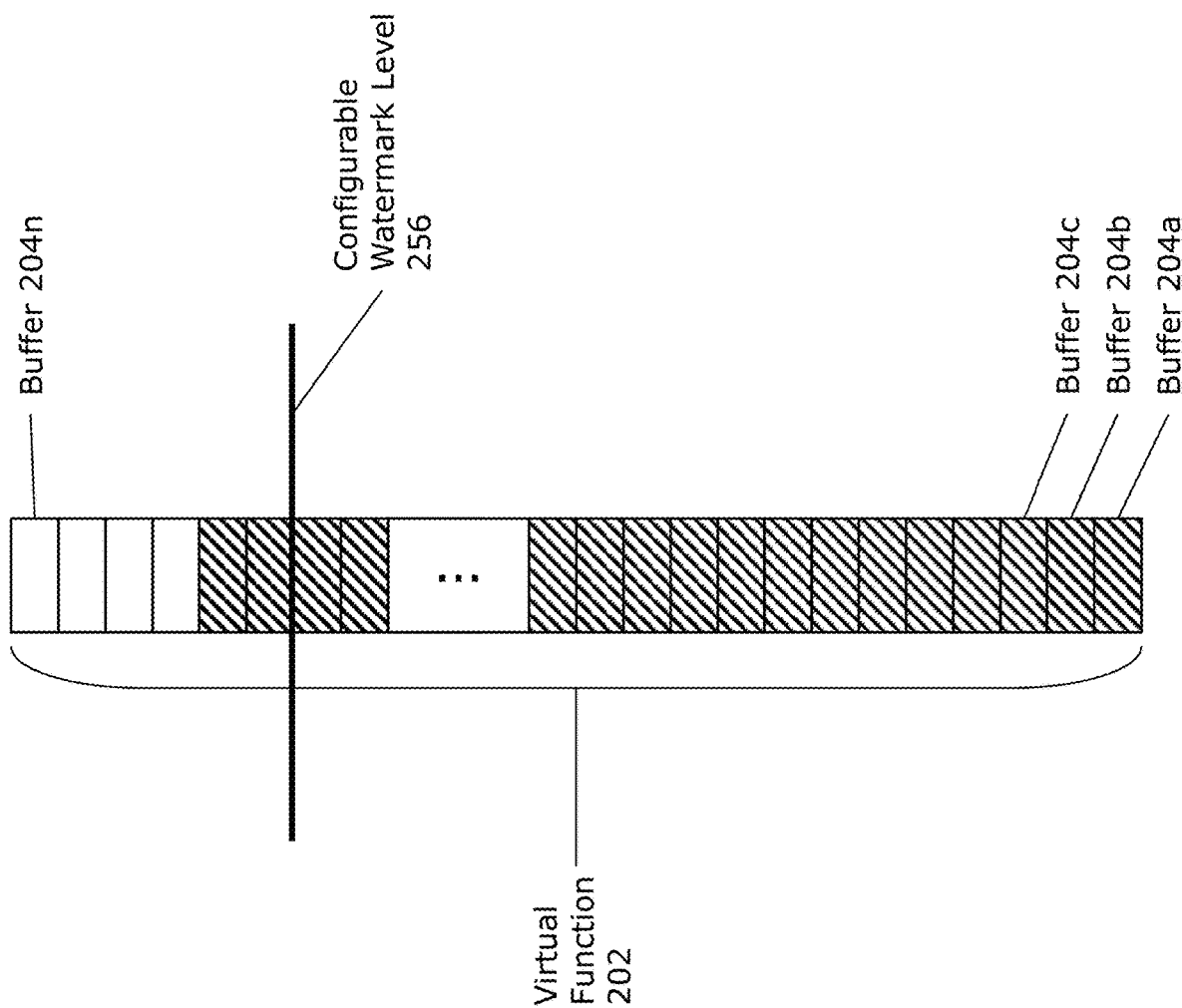

LIMITING BACKPRESSURE WITH BAD ACTORS

RELATED APPLICATION

This application is a continuation of U.S. application Ser. No. 16/029,031, filed Jul. 6, 2018, now U.S. Pat. No. 10,721,172. The entire teachings of the above application are incorporated herein by reference.

BACKGROUND

Processors, and specifically network processors, route packets to and from destinations on a network. In doing so, the processors can perform direct memory access of packets. Certain processors can route the packets to various internal, and in some cases external, functions.

SUMMARY

In an embodiment, a method includes, in response to detecting available memory of a destination node of a packet flow of one or more nodes to the destination node being below a particular threshold, marking the destination node as being in a backpressure state. The destination node in the backpressure state, sends a signal indicating a condition of packet backpressure to the one or more nodes of the packet flow, and initiates a timer for a particular time period. The method further marks, at the end of the particular time period, the destination node as being in a bad actor state if the available memory is below the particular threshold, and as being in a good actor state if the memory is above the particular threshold. The method further, in response to marking the destination node as being in a bad actor state, sends a signal to the one or more nodes of the packet flow causing the one or more nodes to drop packets directed to the destination node.

In an embodiment, packet flow is the distribution of packets from a first node to a destination node, optionally via intermediary nodes. Nodes along the packet flow from the first node to a node before the destination node can be considered upstream from the destination node in the packet flow. Backpressure is applied from the destination node upstream in the packet flow.

In an embodiment, in response to marking the destination node as being in a good actor state, the method sends a signal to the one or more nodes of the packet flow causing the one or more nodes to continue sending packets to the destination node.

In an embodiment, a method marking the destination node as being in the bad actor state further includes throwing an interrupt to other entities related to the packet flow.

In an embodiment, the destination node is a virtual function (VF) ring.

In an embodiment, the threshold is a watermark.

In an embodiment, the method further comprises, at startup, initiating the destination node as being in the bad actor state.

In an embodiment, sending the signal (e.g., applying backpressure) includes sending a signal to the one or more nodes of the packet flow indicating the destination node is not accepting new packets.

In an embodiment, a system includes a processor configured to, in response to detecting available memory of a destination node of a packet flow of one or more nodes to the destination node being below a particular threshold, mark the destination node as being in a backpressure state. The destination node, in the backpressure state sends a signal indicating a condition of packet backpressure to the one or more nodes of the packet flow, and initiating a timer for a particular time period. The processor is further configured to mark, at the end of the particular time period, the destination node as being in a bad actor state if the available memory is below the particular threshold, and as being in a good actor state if the memory is above the particular threshold. In response to marking the destination node as being in a bad actor state, the processor sends a signal to the one or more nodes of the packet flow causing the one or more nodes to drop packets directed to the destination node.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

FIGS. 2A-B are diagrams illustrating an example embodiment of a virtual function having a plurality of buffers.

DETAILED DESCRIPTION

A description of example embodiments follows.

Figure 1A:
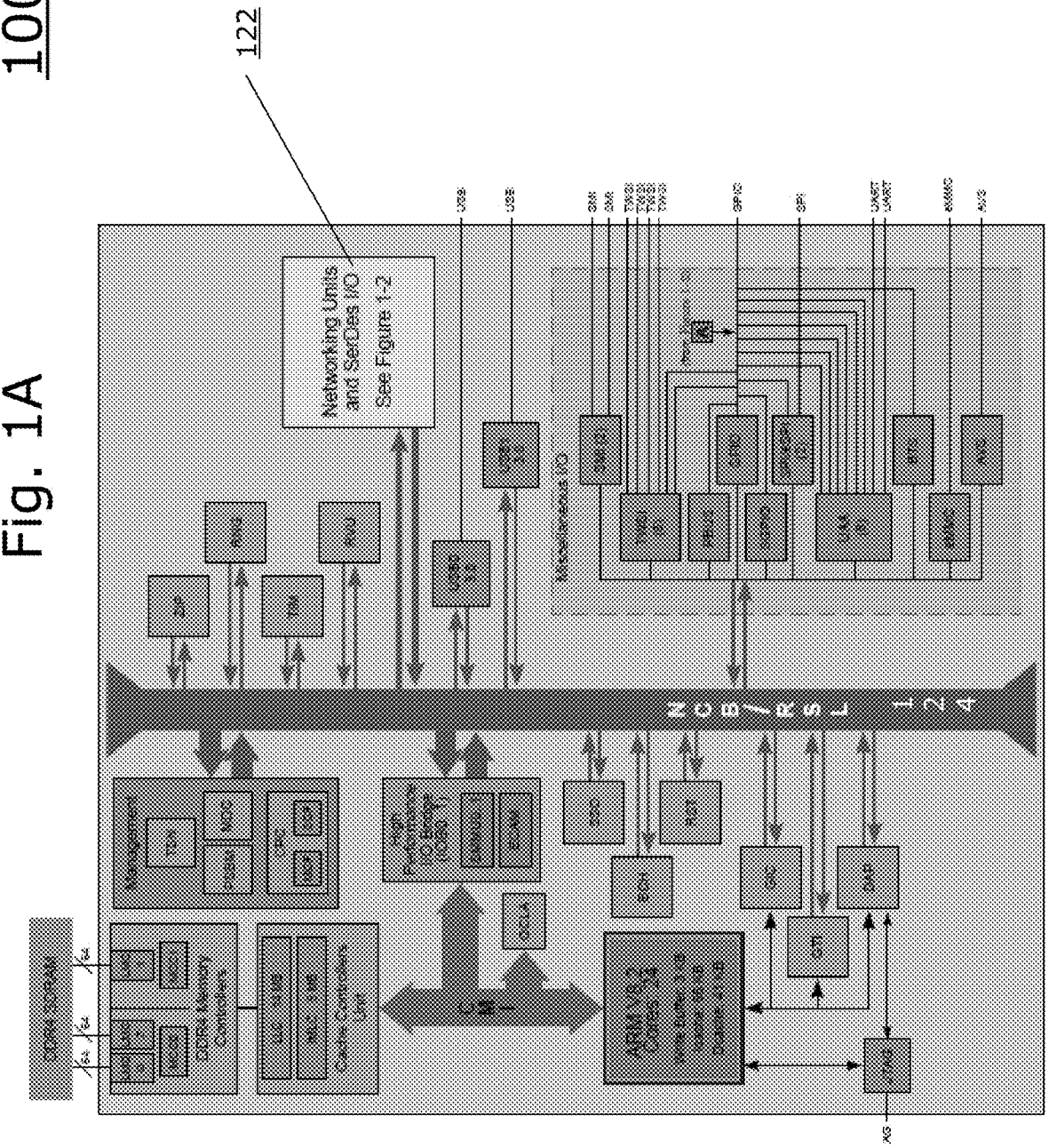
FIG. 1A is a block diagram illustrating a network processor employing a networking units block.

FIG. 1A is a block diagram illustrating a network processor employing a networking units block 122. The networking units block 122 is connected to a Near-Coprocessor Bus (NCB), which facilitates communication with other portions of the chip, including memory and memory controllers, and other modules.

Figure 1B:
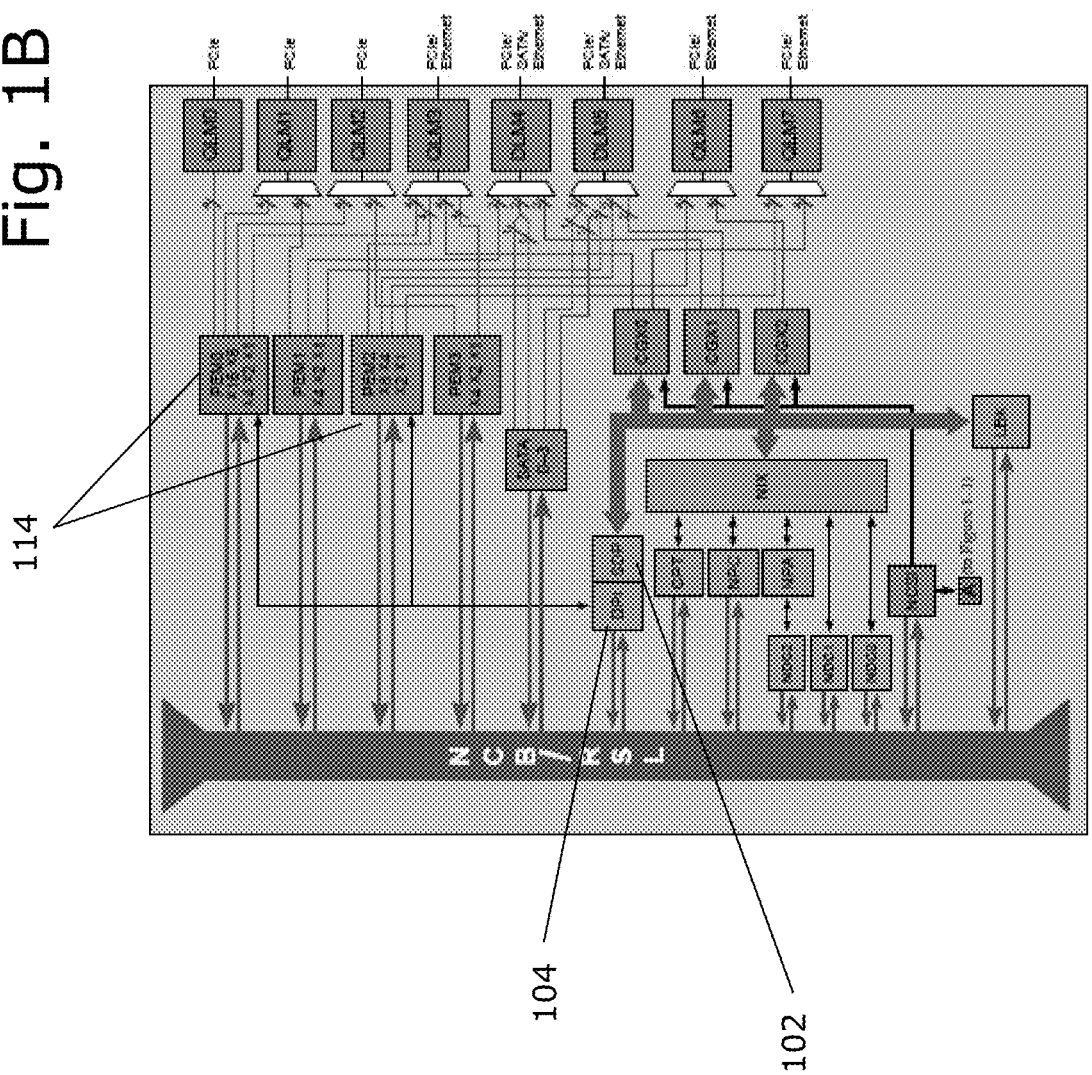
FIG. 1B is a block diagram illustrating an example embodiment of elements within the networking units block and their connections to the NCB.

FIG. 1B is a block diagram 120 illustrating an example embodiment of elements within the networking units block 122 and their connections to the NCB. The System DMA (Direct Memory Access) Packet Interface (DPI) Packet (SDP) Interface Unit 102 is coupled with a DMA Packet Interface (DPI) unit 104. The DPI unit is coupled with the PCI-Express Interface Units (PEM) 114 to receive information from PCI-Express. The SDP 102 can further communicate with a Network Interface Controller (NIC) that exchanges packets with PCIe/SATA/Ethernet.

Figure 1C:
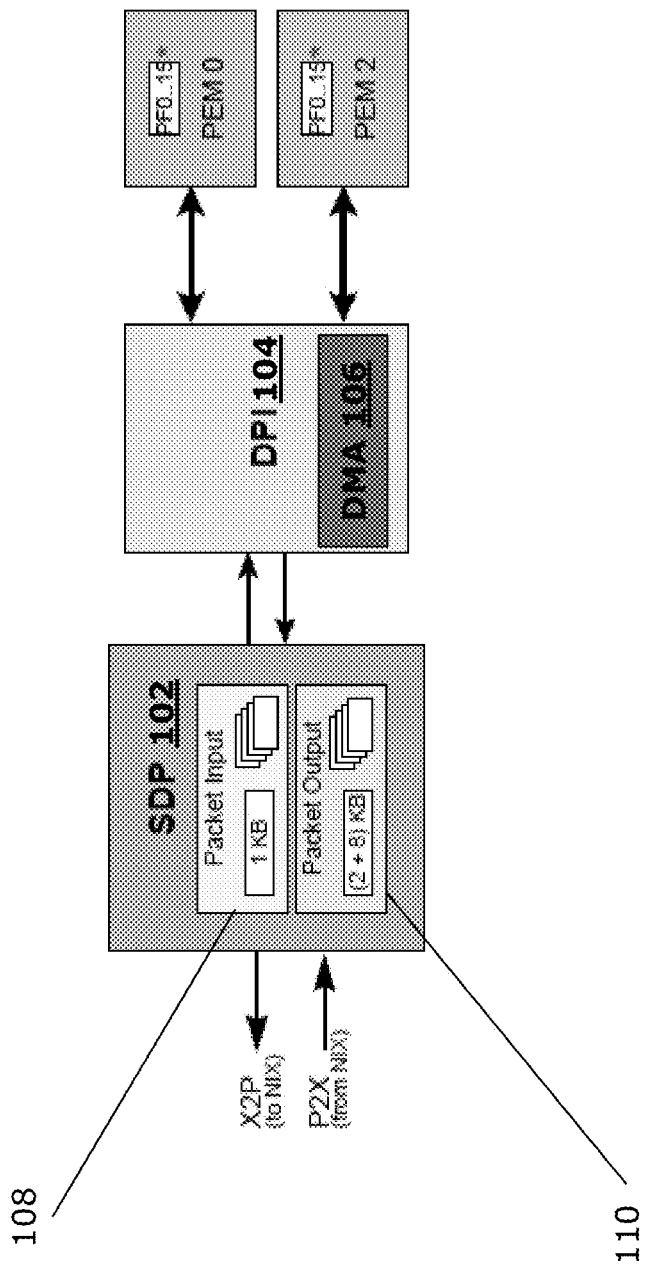
FIG. 1C is a block diagram illustrating an example embodiment of a System DMA Packet Interface (DPI) Packet (SDP) Interface Unit, DMA Packet Interface Unit, and PCI-Express Interface Unit (PEM).

FIG. 1C is a block diagram 130 illustrating an example embodiment of a System DMA Packet Interface (DPI) Packet (SDP) Interface Unit, DMA Packet Interface Unit, and PEM unit. The SDP 102 interface unit provides PCIe Endpoint support for a remote host to DMA packets into and out of a hardware processor. The SDP 102 includes a packet input unit (PKI) 108 and a packet output unit (PKO) 110. The SDP 102 communicates with a DMA Packet Interface (DPI) unit 104 having a direct memory access (DMA) unit

106. The DPI unit 104 further communicates with PEM units, for example, having virtual functions (VFs) and physical functions (PFs).

The SDP 102 has 512 physical SDP input rings that are paired with SDP output rings. A person having ordinary skill in the art can recognize that the exact number of rings can vary, however. A PCIe host or other external device may submit instructions/packets to the SDP 102, which is a way to feed packets or commands to the chip on which the SDP resides.

The SDP 102 can further stop instruction fetches for a physical ring when buffer counts are low. The SDP 102 does not fetch new instructions for a physical ring when the network interface controller (NIC) is exerting backpressure for its respective pair.

In processors that handle packets and packet flows, packet flow management to a particular destination node can be a problem. For example, the destination node can run out of buffer space or memory, which can cause packets to be dropped. To prevent packet dropping, backpressure can be applied to upstream flows when a given function (e.g., virtual function (VF) or physical function (PF)) cannot process packets to prevent overflowing a destination node function with packets. Applying backpressure sends a signal to all upstream devices to stop sending packets to the destination node, however, already sent packets to continue along the packet flow to the destination node. However, if the given function cannot process packets for long periods of time, applying back pressure can congest upstream systems and slow other flows unrelated to the given function. In other words, applying backpressure to systems when resources are limited allows more control in software but can cause congestion to upstream systems.

In an embodiment of the present disclosure, a multi-state framework can solve this congestion problem. In an embodiment, all destination node functions (e.g., VFs and PFs) are assigned a good actor state, bad actor state, and a backpressure state. Other network elements change their behavior with respect to the destination node based on the assigned state.

Limiting backpressure to only destinations node that are behaving in a desirable manner prevents such congestion. Embodiments of the present disclosure identify functions that are not processing packets in a timely manner and prevents them from applying backpressure. Packets sent to bad actor state destinations are dropped, which prevents such packets from filling up local memory.

For example, for destinations in the bad actor state, instead of backpressure, hardware drops all packets destined for the destination node. For destinations in the good actor state, network elements send packets to the destination node as in normal operation. For destinations in the backpressure state, network elements act as if backpressure is applied by not sending any new packets to the destination node.

At startup, all destinations initialize in bad actor states. After sufficient memory buffers are allocated to send packets, the destination node changes to the good actor state. If a destination node does not have sufficient buffers to send packets, it is placed in the backpressure state and a timer is started for that function. When a destination node starts to allow packet traffic to flow again, the timer stops and resets to zero. If a destination node continues not accepting packets and its timer has reached a programmable threshold, the destination node is moved to the bad actor state. Destination nodes can also move from good actor states to bad actor states if a function is disabled or reset, indicating it cannot receive packets. A destination node can also move to bad actor state if a packet is received and there are no buffers to send it to prevent head of line blocking and allow the packet to be dropped.

FIGS. 2A-B are diagrams 200 and 250 illustrating an example embodiment of a virtual function 202 having a plurality of buffers 204*a-n*. The plurality of buffers 204*a-n* can store data or pointers to data in a separate memory.

A configurable watermark level 206 indicates number of buffers that should be available for ideal performance.

In one embodiment, the configurable watermark level 206 can indicate a number of buffers to remain empty. A doorbell or other process can determine the number of filled buffers and compare the number of filled buffers to the watermark. In another embodiment, the doorbell or other process can determine the number of empty buffers and compare the number of empty buffers to the watermark. Such a comparison can be performed either in hardware or by a processor.

In FIG. 2A, the filled buffers 204*a-c* and beyond, which are represented by the buffers having diagonal stripes, are below the configurable watermark level 206. In FIG. 2B, the filled buffers 204*a-c* and beyond are beyond the configurable watermark level 256. As described above, however, the watermark level can instead represent the number of empty buffers instead of the number of filled buffers. A person having ordinary skill in the art can recognize that such a modification can be made, and that the other principles described in this application apply to either embodiment.

Figure 3:
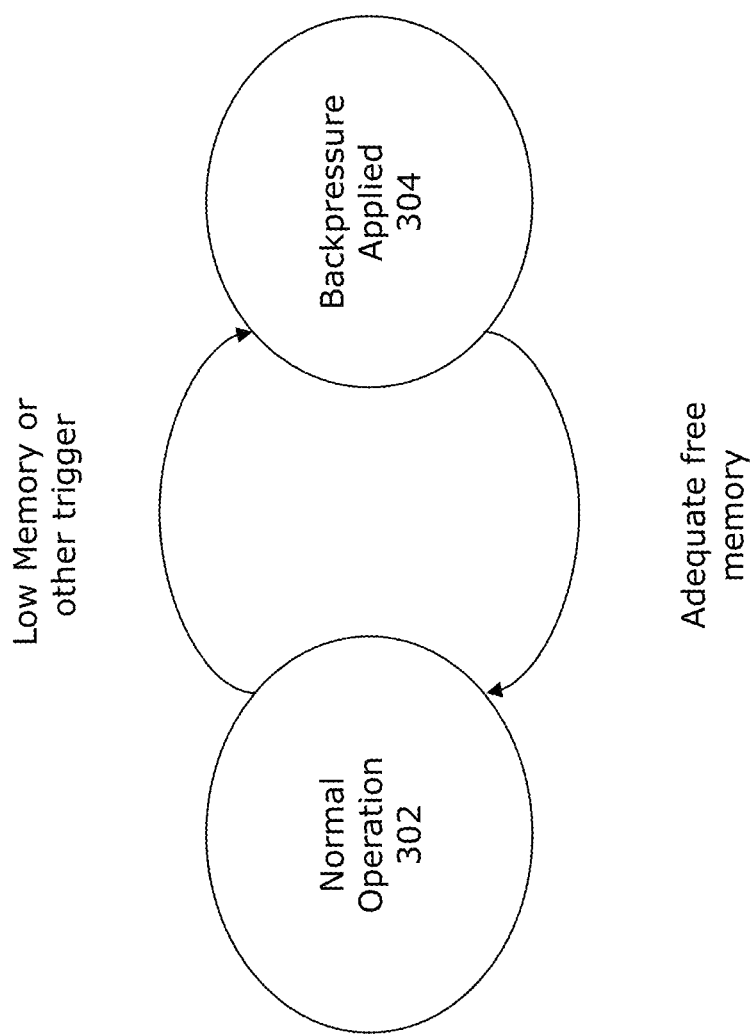
FIG. 3 is a state diagram illustrating an example embodiment of current methods of applying backpressure.

FIG. 3 is a state diagram 300 illustrating an example embodiment of current methods of applying backpressure. A node in normal operation 302, upon having low memory or another trigger from a host, etc., begins applying backpressure 304 by sending a signal to other devices that send it packets. Upon the node regaining adequate free memory, the node signals to the other devices that it has adequate free memory, and returns to normal operation 302.

Figure 4:
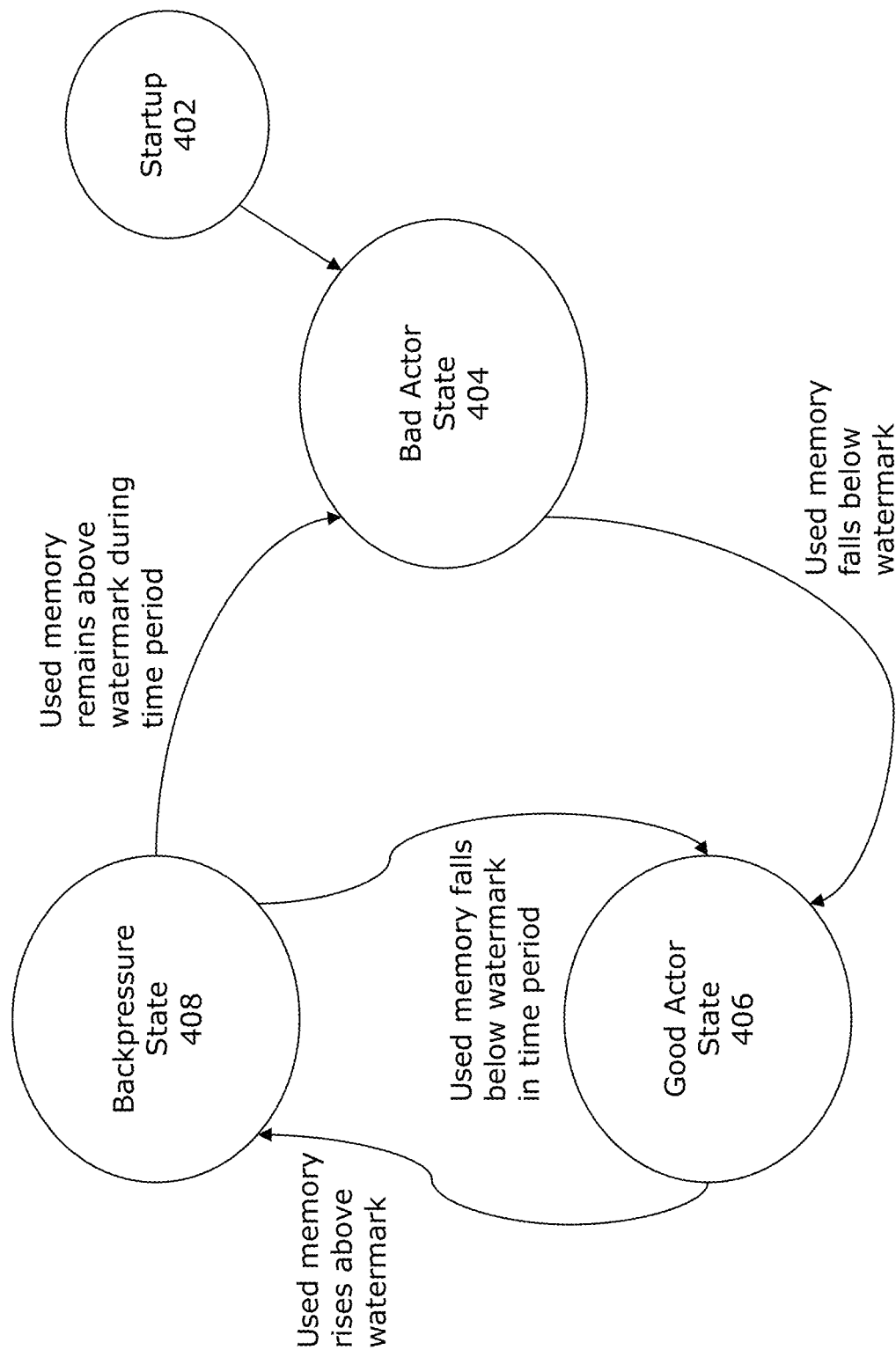
FIG. 4 is a state diagram illustrating an example embodiment of a method of the present disclosure.

FIG. 4 is a state diagram 400 illustrating an example embodiment of a method of the present disclosure. Upon startup 402, a node is initialized into a bad actor state 404 as an assumption. While in the bad actor state 404, the node does not accept any packets being sent to it. Any packets that have already been sent are dropped by hardware. Further, the node can send a signal to other nodes along the packet flow that the node is in a bad actor state, so that the other nodes do not send new packets to the node in the bad actor state 404.

The node, periodically (e.g., after a set number of clock cycles), checks its buffer levels. If the buffer levels are below the watermark level, indicating there is enough memory, the node transitions to a good actor state 406. In the good actor state, the node can receive packets normally with no backpressure or dropped packets.

From the good actor state 406, the used memory of the buffer can rise above the watermark as packets are received. In response, the node can transition to a backpressure state 408. In the backpressure state 408, a signal is sent to all upstream nodes to stop sending new packets. In addition, upon entering the backpressure state, a timer begins to count time or cycles for a configurable amount of time. If, at the end of the period, the used memory remains above the watermark, the node transitions to the bad actor state 404, where backpressure is no longer applied, hardware can drop packets, and no more packets are sent to the destination node. However, if, after the period of time has elapsed, the used memory amount falls below the watermark, the node returns to the good actor state 406.

A person having ordinary skill in the art can recognize that, in other embodiments, events can trigger the good actor state 406 transitioning to the bad actor state 404, such as disabling the node/ring/function, user shutdown of the node/ring/function, an error condition, or no buffers being available.

Figure 5:
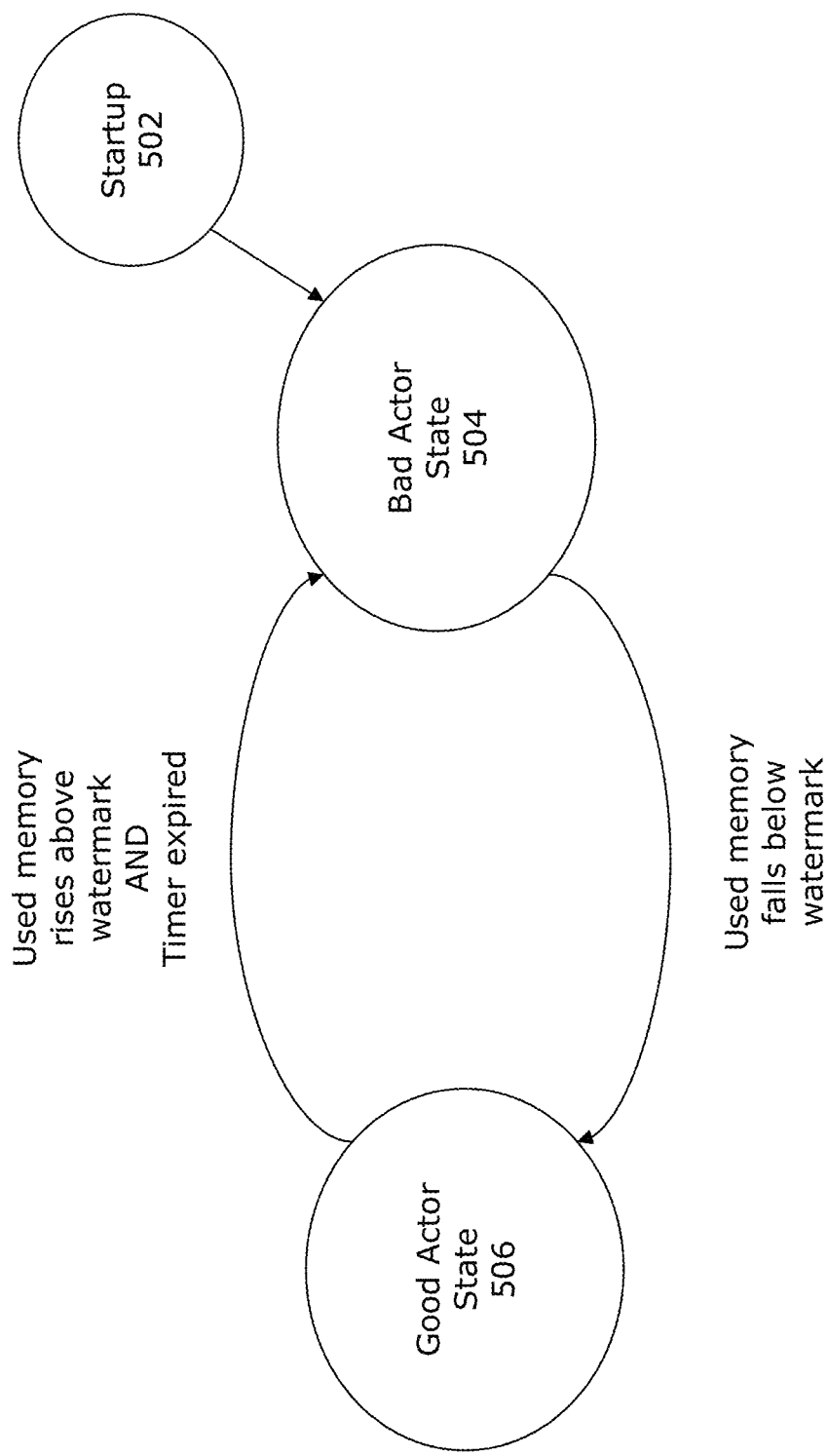
FIG. 5 is a state diagram illustrating an example embodiment of a method employed by the present disclosure.

FIG. 5 is a state diagram 500 illustrating an example embodiment of a method employed by the present disclosure. At startup 502, the node is initialized in a bad actor state 504. While in the bad actor state 504, the node does not accept any packets being sent to it. Any packets that have already been sent are dropped by hardware. Further, the node can send a signal to other nodes along the packet flow that the node is in a bad actor state, so that the other nodes do not send new packets to the node in the bad actor state 504.

Upon detecting that the used memory falls below the watermark, the node transitions to a good actor state 506. When used memory rises above the watermark, the node remains in the good actor state 506 but applies backpressure, as described above, and starts a timer. If, after the timer expires, the used memory remains above the watermark, the node enters the bad actor state 504.

FIGS. 4 and 5 both illustrate respective state diagrams 400 and 500 that solve the same problem with similar solutions. However, the state diagram 400 of FIG. 4 is represented with a two-state solution after the startup state, where the state diagram 500 of FIG. 5 is represented with a tri-state solution after the startup state. Effectively, in FIG. 4, the backpressure state is a separate, but in FIG. 5, the backpressure state becomes part of the good actor state.

The teachings of all patents, published applications and references cited herein are incorporated by reference in their entirety.

While example embodiments have been particularly shown and described, it will be understood by those skilled in the art that various changes in form and details may be made therein without departing from the scope of the embodiments encompassed by the appended claims.

What is claimed is:

1. A method comprising:
   in response to detecting available memory of a destination node of a packet flow of one or more nodes to the destination node being below a particular threshold, marking the destination node as being in a backpressure state and initiating a timer for a particular time period;
   marking, at the end of the particular time period, the destination node as being in a bad actor state if the available memory is below the particular threshold, and as being in a good actor state if the memory is above the particular threshold; and
   in response to marking the destination node as being in a bad actor state, sending a first signal to the one or more nodes of the packet flow causing the one or more nodes to drop packets directed to the destination node.

2. The method of claim 1, further comprising:
   in response to marking the destination node as being in a good actor state, sending a second signal to the one or more nodes of the packet flow causing the one or more nodes to continue sending packets to the destination node.

3. The method of claim 1, wherein marking the destination node as being in the bad actor state further includes throwing an interrupt to other entities related to the packet flow.

4. The method of claim 1, wherein the destination node is a virtual function (VF) ring.

5. The method of claim 1, wherein the threshold is a watermark.

6. The method of claim 1, further comprising:
   at startup, initiating the destination node as being in the bad actor state.

7. The method of claim 1, wherein sending the signal further includes sending the signal to the one or more nodes of the packet flow indicating the destination node is not accepting new packets.

8. A system comprising:
   a processor configured to:
   in response to detecting available memory of a destination node of a packet flow of one or more nodes to the destination node being below a particular threshold, mark the destination node as being in a backpressure state and initiating a timer for a particular time period;
   mark, at the end of the particular time period, the destination node as being in a bad actor state if the available memory is below the particular threshold, and as being in a good actor state if the memory is above the particular threshold; and
   in response to marking the destination node as being in a bad actor state, send a first signal to the one or more nodes of the packet flow causing the one or more nodes to drop packets directed to the destination node.

9. The system of claim 8, wherein the processor is further configured to, in response to marking the destination node as being in a good actor state, sending a second signal to the one or more nodes of the packet flow causing the one or more nodes to continue sending packets to the destination node.

10. The system of claim 8, wherein marking the destination node as being in the bad actor state further includes throwing an interrupt to other entities related to the packet flow.

11. The system of claim 8, wherein the destination node is a virtual function (VF) ring.

12. The system of claim 8, wherein the threshold is a watermark.

13. The system of claim 8, further comprising:
   at startup, initiating the destination node as being in the bad actor state.

14. The system of claim 8, wherein sending the signal includes sending the signal to the one or more nodes of the packet flow indicating the destination node is not accepting new packets.

15. A non-transitory computer-readable medium configured to store instructions thereon, the instructions, when loaded and executed by a processor, cause the processor to:
   in response to detecting available memory of a destination node of a packet flow of one or more nodes to the destination node being below a particular threshold, mark the destination node as being in a backpressure state, and initiating a timer for a particular time period;
   mark, at the end of the particular time period, the destination node as being in a bad actor state if the available memory is below the particular threshold, and as being in a good actor state if the memory is above the particular threshold; and
   in response to marking the destination node as being in a bad actor state, send a first signal to the one or more nodes of the packet flow causing the one or more nodes to drop packets directed to the destination node.

16. The non-transitory computer readable medium of claim 15, wherein the instructions are further configured to cause the processor to:
   in response to marking the destination node as being in a good actor state, send a second signal to the one or more nodes of the packet flow causing the one or more nodes to continue sending packets to the destination node.

17. The non-transitory computer readable medium of claim 15, wherein marking the destination node as being in the bad actor state further includes throwing an interrupt to other entities related to the packet flow.

18. The non-transitory computer readable medium of claim 15, wherein the destination node is a virtual function (VF) ring.

19. The non-transitory computer readable medium of claim 15, wherein the threshold is a watermark.

20. The non-transitory computer readable medium of claim 15, wherein the instructions are further configured to cause the processor to:

at startup, initiate the destination node as being in the bad actor state.

\* \* \* \* \*